United States Patent

[11] 3,626,476

| [72] | Inventor | John G. Trumble |
| | | 160th Ave., Big Rapids, Mich. 49307 |
| [21] | Appl. No. | 847,910 |
| [22] | Filed | Aug. 6, 1969 |
| [45] | Patented | Dec. 7, 1971 |

[54] FUEL TANK PRESSURIZER
1 Claim, 3 Drawing Figs.

[52] U.S. Cl..................................................... 141/329,
222/5, 222/399
[51] Int. Cl..................................................... F24c 5/00,
B67b 7/24
[50] Field of Search........................................... 141/17, 19,
329, 330; 222/5, 399; 285/331, 354; 169/31

[56] References Cited
UNITED STATES PATENTS

| 2,016,113 | 10/1935 | Lambert et al. | 169/31 UX |
| 3,088,522 | 5/1963 | Zellner | 169/31 |
| 685,694 | 10/1901 | Schamp | 285/354 X |
| 937,549 | 10/1909 | Read | 222/399 UX |
| 1,591,871 | 7/1926 | Heinrich | 285/331 |
| 3,024,044 | 3/1962 | Benevento | 141/330 X |
| 3,035,616 | 5/1962 | Hamilton | 141/329 |
| 3,255,824 | 6/1966 | Rodgers | 222/399 X |
| 3,361,298 | 1/1968 | Trumble | 222/399 X |

*Primary Examiner*—Edward J. Earls
*Attorney*—Price, Heneveld, Huizenga & Cooper ABSTRACT: Fuel tank cap assembly for the liquid fuel tank of portable camping burner units, e.g., stoves and lanterns, but especially camping stoves, including an elongated main body to receive and allow controllably actuated puncture of a pressurized gas cylinder therein, one end of this body having a support and gas passage portion mounted in and transverse to the main body and having a surrounding collar connectable to the fuel tank spout to cause the pressurized capsule-containing body to lie closely alongside the fuel tank.

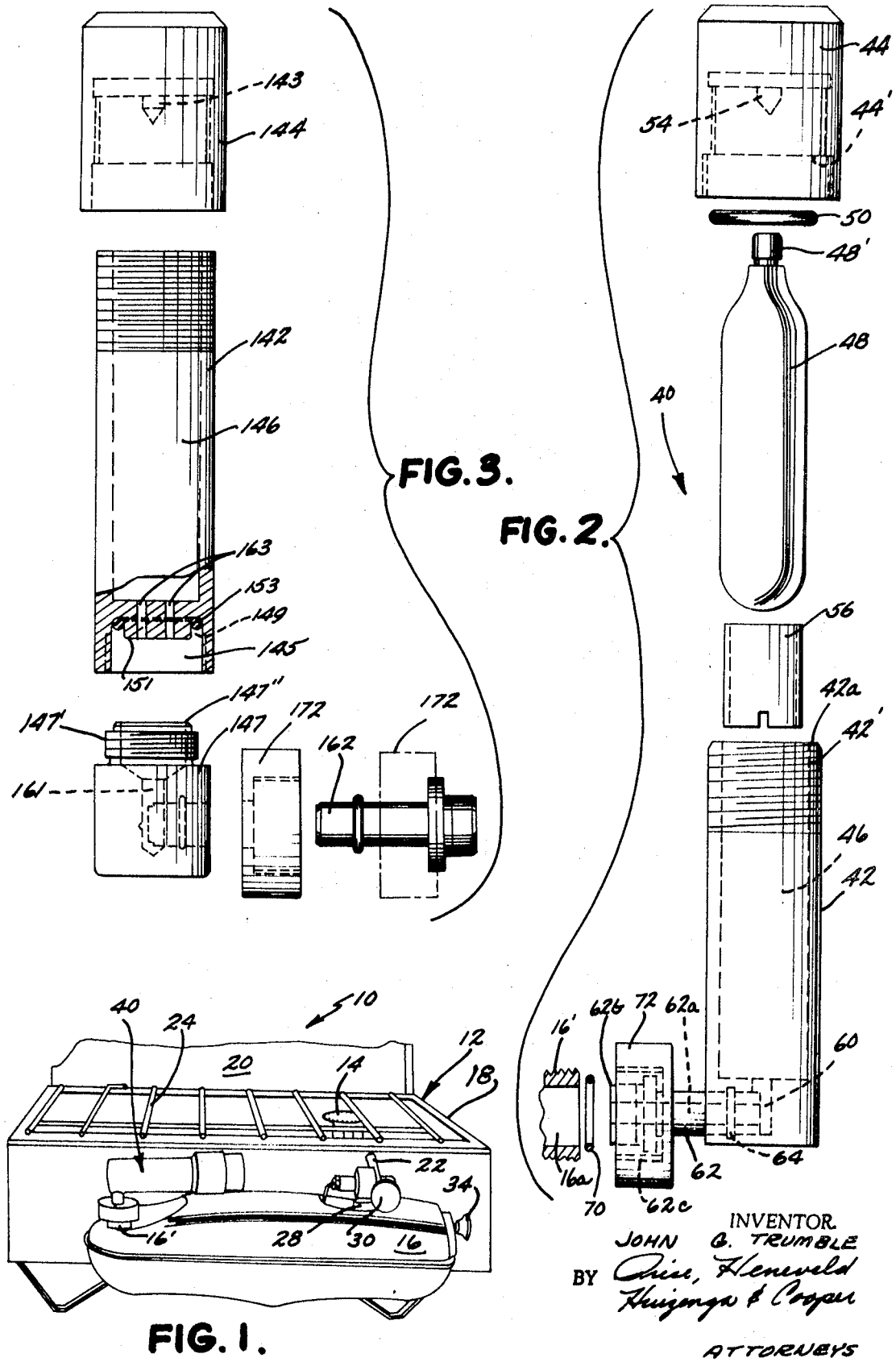

FUEL TANK PRESSURIZER

BACKGROUND OF THE INVENTION

This invention relates to apparatus for portable camping units that employ liquid fuel burners, and more particularly to a special fuel tank cap assembly capable of retaining a pressurized gas cylinder or cartridge lying closely alongside the fuel tank.

This present structure represents a specific unique improvement within the broader concept set forth in my issued U.S. Pat. No. 3,361,298. The structure in this prior patent has been found very useful and practical, in general nature and function. Many of these units have been manufactured and sold by the small company organized for this purpose. The prior unit does however, have the disadvantage of protruding above the top of the stove to which it is attached, or substantially away from the fuel tank of some other camping units with which it is combined. This is particularly noticeable with camping stoves where the pressurized unit protrudes upwardly in the way of cooking utensils being transferred onto or off of the stove. Also, when the stove is folded up for transport, the pressurized unit protrudes upwardly such that it is susceptible of being struck or bumped when packing the stove, or even of preventing the stove cover from being properly folded over the burners.

SUMMARY OF THE INVENTION

It is an object of this invention to provide a unique fuel tank cap assembly of the type to contain a pressure capsule and characterized by a special structure and attachment relationship with respect to the fuel tank that enables the attachment to lie closely alongside the tank. Hence it is immediately adjacent the fuel tank while also being attached in sealing fashion to the fuel tank spout. The unit has the advantages of the prior unit without its disadvantages noted above. Other advantages will be obvious from a study of the following specification and drawings.

The novel attachment has a elongated hollow body with a removable end to enable the reception of a pressurized gas cartridge. Sealing and puncture means are provided in the body in interrelated fashion to cause sealing and then puncture. Projecting laterally from and mounted into the body is a combined support and passage element having a sealed engagement on one end with the elongated body, and sealable fuel tank connector means on the other end.

BRIEF DESCRIPTION OF THE DRAWINGS

FIG. 1 is a perspective view of a camping stove showing the novel unit in combination with the fuel tank of the stove;

FIG. 2 is a side elevational exploded view of the attachment apparatus in FIG. 1; and FIG. 3 is a side elevational exploded view of a modified form of the attachment apparatus.

DESCRIPTION OF THE PREFERRED EMBODIMENTS

Referring now specifically to the drawings, and particularly FIGS. 1 and 2, the combination 10 illustrated in FIG. 1 includes a camping stove subassembly 12 which has burners 14 supplied with fuel from a fuel tank 16. The stove 12 has a conventional housing 18 with a pivotal lift cover 20 shiftable to uncover the burner unit. A conduit 22 conducts pressurized liquid gasoline to an expander-vaporizer (not shown) of conventional type which directs the vaporized fuel into burners 14. A grill 24 covers the burners in conventional fashion.

The gasoline tank 16 is mounted to the front of the housing by suitable brackets (not shown). Conduit 20 is connected to the fuel tank with fitting 28 and includes a tube (not shown) extending down inside the tank almost to the bottom. A control valve 30 of conventional type enables regulation of the flow of the gasoline from the tank through the conduit to the burners.

On one end of tank 16 is a conventional filler spout 16' which basically comprises an upstanding annular member having threads on its outer periphery and defining a central passage 16a into the tank.

The tank 16 may also have a reciprocating, manual plunger type pressure pumping means 34 if desired, although this is not necessary with the use of this invention.

As illustrated in FIG. 1, combined with stove subassembly 12 is the attached pressurizing subassembly 40. This subassembly includes an elongated normally cylindrical body 42 which has threads 42' on its outer periphery at one end thereof to threadedly engage with the threads in the inner periphery of a closure cap 44. These two cooperative elements define an internal chamber 46 to receive a pressurized gas capsule or cylinder 48 therein having a puncturable end 48'. An annular seal such as O-ring 50 fitting between an annular shoulder 44' of cap 44, and the axial end 42a of body 42 provides a seal between these members when threaded together. The O-ring is slightly compressible such that, after the seal occurs, further twisting of cap 44 enables capsule 48 to be punctured with puncture means 54 located in the chamber and, preferably in the cap portion thereof. A suitable adapter spacer 56 may be inserted in chamber 46 to enable the unit to accommodate shorter pressure cylinders 48 if necessary.

In the end of body 42 opposite from the end which engages cap 44, is a passageway 60 communicant with chamber 46 on one end and with the inner end of a special transverse insert member 62 on the other end. Specifically, member 62 is preferably press fitted into a receiving correspondingly sized and shaped opening in the second end of body 42. An annular seal such as O-ring 64 extending around the inner end of member 62 assures a seal between transverse member 62 and body 42. Member 62 can be held by the press fit, but may also be welded to body 42 or otherwise suitably sealed and retained. If the unit is molded of plastic for example, the elements can be sonic welded or the like. Member 62 has an internal passage 62a communicating with passage 60 and hence with chamber 46 on one end, and terminating in a port on the other outer end of member 62. This outer end of member 62 has an integral, axially extending pilot stub 62b of a diameter to fit inside the interior of filler spout 16' of the fuel tank with a small clearance. An annular seal such as O-ring 70 fits closely around stub 62b and against an annular shoulder 62c integral with member 62 and spaced from the second outer end of this member by the pilot stub 62b. Annular, radially projecting shoulder 62c cooperates with the outer annular face of filler spout 16' to sealingly retain O-ring 70 therebetween with tightening of collar 72 onto the filler spout. This collar includes threads on its inner periphery engageable with the filler spout, and extends over shoulder 62c and pilot stub 62b as illustrated in FIG. 2. Collar 72 engages behind shoulder 62c to enable the sealed connection to be made.

When it is desired to attach subassembly 40 illustrated in FIG. 2 to fuel tank 16 of stove subassembly 12, body 42 is placed adjacent and generally parallel to the elongated fuel tank, closely adjacent thereto, with collar 72 being threadably engaged to the filler spout to form the seal therebetween. The axis of the elongated body with cap is thus generally transverse and specifically normal to the axis of member 62, which in turn is generally transverse and specifically normal to the axis of spout 16'. The subassembly can be rotated with respect to the tank while retaining an effective seal.

When a pressurized capsule 48 is inserted in body 42, cap 44 is attached until a seal is made by O-ring 50. When it is desired to pressurize the fuel in tank 16, cap 44 is tightened a bit more to cause piercing pin 54 to puncture the capsule and release the pressurized gas. This pressurized gas invades chamber 46 and flows through passageway combination 60–62a, i.e. through member 62, to tank 16 to pressurize its fuel contents. Valve 30 is then used in conventional fashion to control passage of the pressurized fuel to the burners. When a person is through using the stove, the burners are shut off, and the stove can be folded up in conventional fashion. Subassembly 40 is still in a compact position not protruding above the burner so as to strike against other objects when the stove is being packed away.

In FIG. 3 is illustrated a modified form of the apparatus. Specifically, the modified subassembly 140 includes a main body portion 142 cooperable with a threaded cap 144 to define a chamber 146 in the same fashion as body 42 and cap 44 explained previously. The chamber includes puncture element 143. On the opposite end of the body portion 142 from cap 144 is a female threaded socket 145. Into this socket is inserted supplemental body portion 147, and specifically the threaded stub 147' thereof. Socket 145 has in its inner axial end a special pilot protrusion 151 which projects toward the open outer axial socket end. This stub cooperates with the inner peripheral wall of the socket to define and annular seal retaining groove 149 for a seal such as O-ring 153. The threads in socket 145 terminate short of this groove to prevent damage of the seal with engagement of axial annular face 147'' of stub 147' against the seal. Pilot 151 prevents the seal 153 from being squashed so out of shape as to cause leakage.

Member 147 includes a passage 161 communicating with chamber 146 through one or more passages 163. Extending into an opening in the side of member 147 is transverse member 162 identical with member 62 in the previous form, and including an identical collar 172. The mode of use of this modified apparatus in FIG. 3 is the same as that described with respect to FIGS. 1 and 2.

The embodiments of the invention in which an exclusive property or privilege is claimed are defined as follows.

1. A fuel tank cap assembly for the liquid fuel tank of portable burner units, including an elongated hollow body defining a sealable pressure cylinder receiving and retention chamber, said body having a cylinder-receiving opening on one end and a removable cover engageable with said opening to sealably close the same, cylinder puncture means in said chamber; the improvement comprising: said body including an opening for receiving a transverse protrusion member, said transverse member having an inner end which is force fitted into said opening, said member extending transversely from said body, said inner end being encircled by an annular seal inside said body opening such that said inner end of said member is in sealed relation with said body, said member having an outer end around which a fuel tank connecting, female, internally threaded collar is positioned, said member forming the support for said body and defining a passageway communicant with said body chamber and opening through a port in said outer end to be communicant with a fuel tank to which said assembly is attached, said member and its connection with said body being sufficiently rigid that said body is supportable with respect to said fuel tank solely by said member when said assembly is attached to said fuel tank by said collar.

* * * * *